United States Patent [19]
Asari et al.

[11] Patent Number: 5,798,878
[45] Date of Patent: Aug. 25, 1998

[54] SHAPE CONTROL APPARATUS FOR REFLECTING MIRRORS

[75] Inventors: Kouki Asari; Hiromichi Mori; Eiichi Sakai, all of Tokyo, Japan

[73] Assignee: Mitsubishi Denki Kabushiki Kaisha, Tokyo, Japan

[21] Appl. No.: 747,492

[22] Filed: Nov. 12, 1996

[30] Foreign Application Priority Data

Apr. 18, 1996 [JP] Japan .................... 8-096778

[51] Int. Cl.$^6$ ............ G02B 5/08; G02B 7/182; G02B 7/188; G02B 7/192
[52] U.S. Cl. .............. 359/846; 359/847; 359/848; 359/849
[58] Field of Search ................... 359/846, 847, 359/848, 849

[56] References Cited

U.S. PATENT DOCUMENTS 5,461,514 10/1995 Sasaki et al. ............ 359/848
5,552,006 9/1996 Soliday et al. ............ 359/847

FOREIGN PATENT DOCUMENTS 4372811 12/1992 Japan .

OTHER PUBLICATIONS

John W. Hardy, "Adaptive Optics", Scientific American, Jun. 1994.

*Primary Examiner*—Paul M. Dzierzynski
*Assistant Examiner*—Mohammad Y. Sikder
*Attorney, Agent, or Firm*—Rothwell, Figg, Ernst & Kurz

[57] ABSTRACT

The control of a mirror's shape, such as for use in large reflecting telescopes, is associated with discrete points so as to avoid incurring constraints and exerting undesirable stress on the reflecting mirror through control unrelated to the mechanical characteristics. Thus, a reflecting mirror is approximated by a non-constrained circular plate having a similar mechanical structure, and an eigenfunction value arithmetic unit calculates values of Bessel-Fourier functions which are eigenfunctions of free vibrations of the circular plate. Using these function values, a mode displacement identification unit approximates a required mirror displacement, which is necessary to correct for wavefront distortion, with a linear combination up to a prescribed mode of vibration of the eigenfunction. A support mechanism command unit controls an actuator so that the value of the linear combination function equals the amount of mirror displacement at a position supported by a reflecting mirror support mechanism.

8 Claims, 3 Drawing Sheets

SHAPE CONTROL APPARATUS FOR REFLECTING MIRRORS

BACKGROUND OF THE INVENTION

1. Field of the Invention

The present invention relates to a shape control apparatus for reflecting mirrors, which controls the shape of a reflecting mirror to provide reflected rays having an orderly wavefront in astronomical telescopes, laser nuclear fusion apparatus, etc.

2. Description of the Related Art

The performance of large astronomical telescopes depends on, amongst other things, how much light can be gathered and 125 etected from the observed object. Currently, instead of conventional photographic emulsions, CCDs featuring superior quantum efficiency, which is the efficiency of detecting photons, are used with a photon efficiency approaching 100%. For this reason, there is not much room for improvement in the quantum efficiency, and methods are being devised to enlarge the apertures of telescopes to increase the amount of light gathered.

However, telescopes having a large aperture deform due to their massive size and weight, thus making it difficult to construct them with high precision. Efforts have been made to solve this difficulty in current reflecting telescopes, by making the glass material of the primary mirror thin and light, and through "active optics technology" and "adaptive optics technology."

"Active optics technology" refers to technology where the shape of an optical system is actively controlled by a computer-controlled support mechanism so that an observation system having high resolution can be configured.

"Adaptive optics technology" refers to technology where the wavefront of an output light from an optical system is observed, and the observed result is feedback to control the shape of the optical system so as to yield high quality rays of light having an orderly wavefront, namely light waves that are in phase.

These active optics and adaptive optics technologies are also adopted in the reflecting mirrors of laser nuclear fusion apparatus for concentrating a laser beam, which irradiates a material for nuclear fusion, into a single point to ensure the energy intensity.

A shape control apparatus for reflecting mirrors uses these active optics and adaptive optics technologies to control the shape of a reflecting mirror. An example of prior art is the apparatus disclosed in Japanese Laid-Open Publication No. Hei 4-372811.

FIG. 2 is a system block diagram showing a conventional shape control apparatus for a reflecting mirror. A reflecting mirror 101 is supported by a reflecting mirror support mechanism 102. A wavefront detector 103 detects wavefront distortion in the reflected light rays from the reflecting mirror 101 and outputs wavefront distortion data 104. A controller 105 inputs wavefront distortion data 104 and outputs support mechanism control data 107 to actuators 106 (stress generating units) 106 included in reflecting a mirror support mechanism 102. Actuators 106 exert forces on the reflecting mirror based on this support mechanism control data 107 so as to deform and correct the shape of the reflecting mirror 101.

The controller 105 comprises a mirror displacement converter 108, an eigenvector arithmetic unit 109, a mode displacement identification unit 110, and a support mechanism command unit 111. The mirror displacement converter 108 inputs wavefront distortion data 104 and outputs a required mirror displacement 112, which is necessary to correct the wavefront distortion, for multiple points on the mirror. These multiple points form a subset of vibration points when the reflecting mirror is represented as a discrete model such as through a finite element method. On the other hand, the eigenvector arithmetic unit 109 performs mechanical vibration analysis on these vibration points representing the discrete model, and outputs eigenvectors 113 corresponding to the modes of vibration. The various elements of the eigenvector 113 correspond to the amplitudes of the respective vibration points. The mode displacement identification unit 110 approximates required mirror displacement 112 with a linear combination of eigenvectors 113 using the method of least squares. A fulcrum where the reflecting mirror support mechanism 102 supports the reflecting mirror is selected from among the vibration points representing the discrete model. The support mechanism command unit 111 outputs support mechanism control data 107 to actuators 106 to achieve a displacement defined by eigenvector linear combination 114.

The controller 105 can be configured as an electronic circuit, for example. Such an electronic circuit can be a set of electronic printed-circuit boards based on a microprocessor such as VMEbus cards, or a computer such as a personal computer or workstation.

A method for solving for linear combination 114 from N values of required mirror displacement 112 in the controller 105 is described using formulas. First, examples of the notation used in the following description are given. (g) is a line vector g, $(g)_k$ is the kth element of (g), $<g,h>$ is an inner product (scalar product) of vector g and vector h, [M] is a matrix M, $[M]^{-1}$ is an inverse matrix of matrix [M], and $[M]_{ij}$ is the (i,j) element of matrix (M). Letting N be the number of vibration points, a linear combination 114 of the eigenvectors for the first through Nth modes of vibration in these points is expressed by the following formula.

$$(f) = c_1 \cdot (f_1) + c_2 \cdot (f_2) + \ldots + c_N \cdot (f_N) \qquad (1)$$

In this formula, $(f_k)$ and $c_k (k=1 \sim N)$ are, respectively, the eigenvector 113 of the kth mode of vibration and the vibration coefficient of that mode. The number of elements in the eigenvector 113 is N and equal to the number of vibration points. Furthermore, since the eigenvector 113 is provided by the eigenvector arithmetic unit 109, solving for linear combination 114 is the same as solving for $c_k(k=1 \sim N)$. Let the N-element line vector, where $c_k$ is the kth component, be a mode displacement vector c.

A measured value equivalent to (f) is the required mirror displacement 112, and the N-element vector, where the elements are represented by the values at the measured points of required mirror displacement 112, is the measured displacement vector d. Then, the mode displacement vector c is solved using the measured displacement vector d, and a linear combination 114 of the eigenvector must be determined. Namely, solve for $c_k$ (k=1~N) to satisfy $$(d) = c_1 \cdot (f_1) + c_2 \cdot (f_2) + \ldots + c_N \cdot (f_N) \qquad (2)$$

Defining $$[A]_{jk} = <f_j, f_k> \qquad (3)$$

$$(b)_j = <f_j, d>, (j, k=1 \sim N) \qquad (4)$$

formula 2 can be expressed by the following normal equation.

$$[A](c) = (b) \qquad (5)$$

Formula 5 yields the following calculation formula for determining the mode displacement vector through the method of least squares.

$$(c) = |A|^{-1}(b) \tag{6}$$

Solving for mode displacement vector c from formula 6 yields linear combination 114 of eigenvectors 113.

In this conventional apparatus, the mirror deformation is approximated and controlled using eigenvectors in the mechanical vibration of the reflecting mirror. In other words, since the deformation mode to be used in the control of the shape of the reflecting mirror is based on the mechanical structure of the reflecting mirror, the generation of stress in the reflecting mirror, which is undesirable and hazardous in terms of safety and service life, can be prevented. Another advantage is that the magnitude of force generated by actuator 106 lies within a moderate range.

FIG. 3 is a system block diagram showing another conventional shape control apparatus for a reflecting mirror. Unless otherwise mentioned, the reference numeral of a compositional element in FIG. 3 having the same name as that in FIG. 2 is indicated with the corresponding reference numeral in FIG. 2 to which 100 has been added, and has the same function.

A controller 205 includes a Zernike's circle polynomial value arithmetic unit 209 instead of the eigenvector arithmetic unit 109 in the above-mentioned conventional apparatus. Multiple points on the mirror, for which a mirror displacement converter 208 outputs a required mirror displacement 212, are not subject to the type of constraint described for the above-mentioned conventional apparatus as long as they are on the mirror. Zernike's circle polynomial value arithmetic unit 209 outputs a function value 213 for the Zernike's circle polynomial defined in the mirror in multiple measured points of the above-mentioned required mirror displacement. Zernike's circle polynomials are often used in the evaluation of optical aberration and an advantage is that the optical significance of a deformation is easy to understand since the low order modes correspond to astigmatism, spherical aberration, and so forth. A mode displacement identification unit 210 approximates required mirror displacement 212 with a linear combination 214 of Zernike's circle polynomials. Since the linear combination 214 of Zernike's circle polynomials is continuous in the mirror, a fulcrum where a reflecting mirror support mechanism 202 supports the reflecting mirror is not subject to the constraint described in the above-mentioned conventional apparatus. A support mechanism command unit 211 outputs, to actuators 206, support mechanism control data 207 to achieve a displacement defined by linear combination 214 of Zernike's circle polynomials.

A method for solving the linear combination 214 from required mirror displacement 212 in the controller 205 is similar to the method in the above-mentioned controller 105. It is described here with emphasis on the difference between both methods from their mathematical representations. In the conventional apparatus, the mirror displacement is expressed in the following formula representing a linear combination 214 of Zernike's polynomials which is a continuous function in the mirror.

$$f(p) = c_1 f_1(p) + c_2 f_2(p) + \ldots + c_N f_N(p) \tag{7}$$

In this formula, $f_k(p)$ (k=1~N) represent Zernike's circle polynomials 213 of the kth mode, and p is a coordinate on the mirror.

The Zernike's circle polynomials are defined in the following formulas using polar coordinates $(\rho, \theta)$.

$$Z_{nm}(\rho,\theta) = A_{nm} R_{nm}(\rho) \cos(m\theta)$$

$$Z_n^{-m}(\rho,\theta) = B_{nm} R_{nm}(\rho) \sin(m\theta)$$

In these formulas, $R_{nm}(\rho)$ is a radius vector polynomial expressed in the following formula.

$$R_{nm}(\rho) = \sum_{t=0}^{(n-m)/2} (-1)^t \frac{(n-t)!}{t! \left(\frac{n+m}{2} - t\right)! \left(\frac{n-m}{2} - t\right)!} \rho^{n-2t}$$

Several actual representations of low-order $R_{nm}$ are given below.

$R_{00}(\rho) = 1$
$R_{11}(\rho) = \rho$
$R_{20}(\rho) = 2\rho^2 - 1$
$R_{22}(\rho) = \rho^2$
$R_{31}(\rho) = 3\rho^3 - 2\rho$
$R_{33}(\rho) = \rho^3$
$R_{40}(\rho) = 6\rho^4 - 6\rho^2 + 1$
$R_{42}(\rho) = 4\rho^4 - 3\rho^2$
$R_{44}(\rho) = \rho^4$ Formula 8 which corresponds to formula 3 for the above-mentioned controller 105 is defined next. The integral represents a surface integral on the mirror.

$$[A]_{jk} \equiv \int_S f_j(p) f_k(p) dp \tag{8}$$

On the other hand, the measured displacement vector d is a vector including the required mirror displacement 212, $d_k$ (k=1~N), as an element in the measured point $p_k$ (k=1~N) of the required mirror displacement 212, discretely defined on the mirror. Thus, a formula corresponding to formula 4 for the above-mentioned controller 105 is provided in the following formula in which the integral on the mirror is replaced by a sum.

$$(b)_j = \langle h_j, d \rangle, \quad (j=1 \sim N) \tag{9}$$

where $$(h_j)_k \equiv f_j(p_k)$$

Formulas 7 through 9 yield a normal equation 10 similar to formula 5.

$$[A](c) = (b) \tag{10}$$

Formula 10 yields calculation formula 11 for determining the mode displacement vector through the method of least squares.

$$(c) = |A|^{-1}(b) \tag{11}$$

Solving for mode displacement vector c from formula 11 yields the linear combination 214 of Zernike's polynomials.

In the conventional apparatus, the mirror deformation is approximated and controlled using a continuous function in the form of Zernike's circle polynomials so that it is not necessary for the measured points for the required mirror displacement 212 to coincide with the fulcrums where the reflecting mirror support mechanism 203 supports the reflecting mirror. In other words, even if a wavefront detector 203 has rotated with respect to the mirror, an appropriate support mechanism control data 207 can be obtained for the fulcrums of the reflecting mirror support mechanism 202.

The conventional shape control apparatus for a reflecting mirror shown in FIG. 2 performs measurement of required mirror displacement 112, linear combination approximation of the mode of vibration, and exerting force on the mirror by the reflecting mirror support mechanism 102, for the discrete points which represent the reflecting mirror as a discrete model such as through a finite element method. For this reason, if the wavefront detector 103 rotates with respect to the mirror and the measured points fail to coincide with the above-mentioned discrete points, the problem was that the related conventional shape control apparatus for a reflecting mirror was not able to handle it in its original configuration.

The conventional shape control apparatus for a reflecting mirror shown in FIG. 3 expresses the mirror deformation as a linear combination of Zernike's circle polynomials. Although Zernike's circle polynomials make it easy to understand the optical effect of the deformation, they are not associated with the mechanical characteristics of the reflecting mirror. For this reason, the deformation is large at the periphery of the mirror and actuators 206 of reflecting mirror support mechanism 202 must generate large forces. At the same time, the reflecting mirror undergoes great stress which presents undesirable problems with respect to mirror breakage prevention in terms of safety and service life. Furthermore, since Zernike's circle polynomials represent a function defined in the polar coordinate system, another problem is that the conventional apparatus is applicable to circular mirrors but not to rectangular mirrors.

SUMMARY OF THE INVENTION

It is therefore an object of this invention to solve the problems of a conventional shape control apparatus for reflecting mirrors. A first aspect of this invention allows changes to occur in the measured points of the required mirror displacement such those as due to rotation of the wavefront detector with respect to the mirror, and improves the safety and service life of reflecting mirrors. In addition, a second aspect of this invention provides a shape control apparatus for reflecting mirrors that is applicable to rectangular mirrors.

In a shape control apparatus for reflecting mirrors having a first aspect of this invention, the controller features a calculation, from the wavefront distortion data, of the required mirror displacement for multiple points on the mirror necessary to correct for wavefront distortion, an approximation of the above-mentioned required mirror displacement at the multiple points with a best fit approximation function which is a linear combination up to a prescribed mode of vibration of the eigenfunction in accordance with the mirror's shape and boundary condition, and a control of the actuators of the above-mentioned reflecting mirror support mechanism so that the value of the best fit approximation function becomes the mirror displacement at the positions supported by the reflecting mirror support mechanism.

The best fit approximation function signifies a function which satisfies the condition for best fit approximation, and as an actual example, a best fit approximation in terms of least squares, namely a function which satisfies the condition of the least squares approximation, can be used.

In accordance with the mirror's shape and boundary condition, Bessel-Fourier functions which are eigenfunctions of free vibrations of a non-constrained circular plate, Bessel-Fourier functions which are eigenfunctions of free vibrations of a circular plate having a fixed periphery, Bessel-Fourier functions which are eigenfunctions of free vibrations of a non-constrained circular plate having a hole at its center, Bessel-Fourier functions which are eigenfunctions of free vibrations of a circular plate having a hole at its center and having a fixed periphery, 2-dimensional Fourier functions which are eigenfunctions of free vibrations of a non-constrained rectangular plate, 2-dimensional Fourier functions which are eigenfunctions of free vibrations of a rectangular plate having a fixed periphery, and 2-dimensional Fourier functions which are eigenfunctions of free vibrations of a rectangular plate having an opposing pair of fixed edges, for example, can be used for the above-mentioned eigenfunction. These eigenfunctions are defined in the mirror.

According to the shape control apparatus of this invention, an advantage is that the mirror deformation can be measured at an arbitrary point on the mirror so as to accommodate changes in the measured points, such as those resulting from rotation of the wavefront detector with respect to the reflecting mirror, since the mirror's shape is controlled using continuous functions based on eigenfunctions of free vibrations of the mirror. Another advantage is that there is no danger of an unnatural force being exerted on the reflecting mirror during mirror deformation control since the above-mentioned eigenfunctions are based on the characteristics of the mechanical structure of the reflecting mirror and this improves the safety and service life of the reflecting mirror. In other words, according to this invention, the mirror deformation control with high precision is performed having the above-mentioned advantages so that high quality rays of light and reflected images can be obtained. The shape control apparatus for reflecting mirrors having the second aspect of this invention uses, from among the above-mentioned eigenfunctions, the 2-dimensional Fourier functions which are eigenfunctions of free vibrations of a rectangular plate. According to the second aspect of this invention, the control of mirror deformation is possible so that high quality rays of light and reflected images can be obtained, not only with circular reflecting mirrors, but also with rectangular reflecting mirrors.

DETAILED DESCRIPTION OF THE PREFERRED EMBODIMENTS

First Embodiment

Embodiments of the invention are described in the following with the embodiments used in large, reflecting type, optical telescopes.

Figure 1:
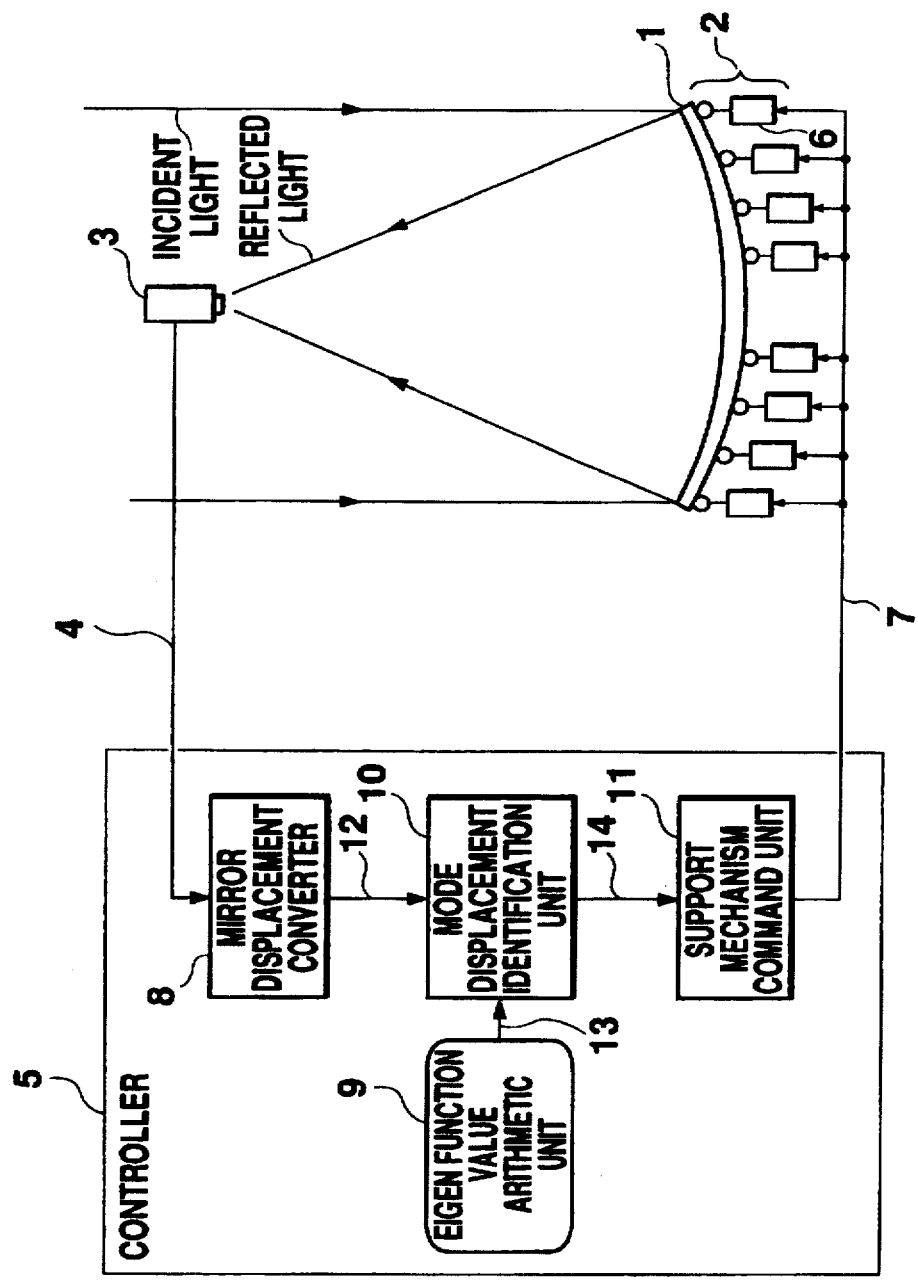
FIG. 1 is a system block diagram showing a large, reflecting type, optical telescope embodying this invention.
Figure 2:
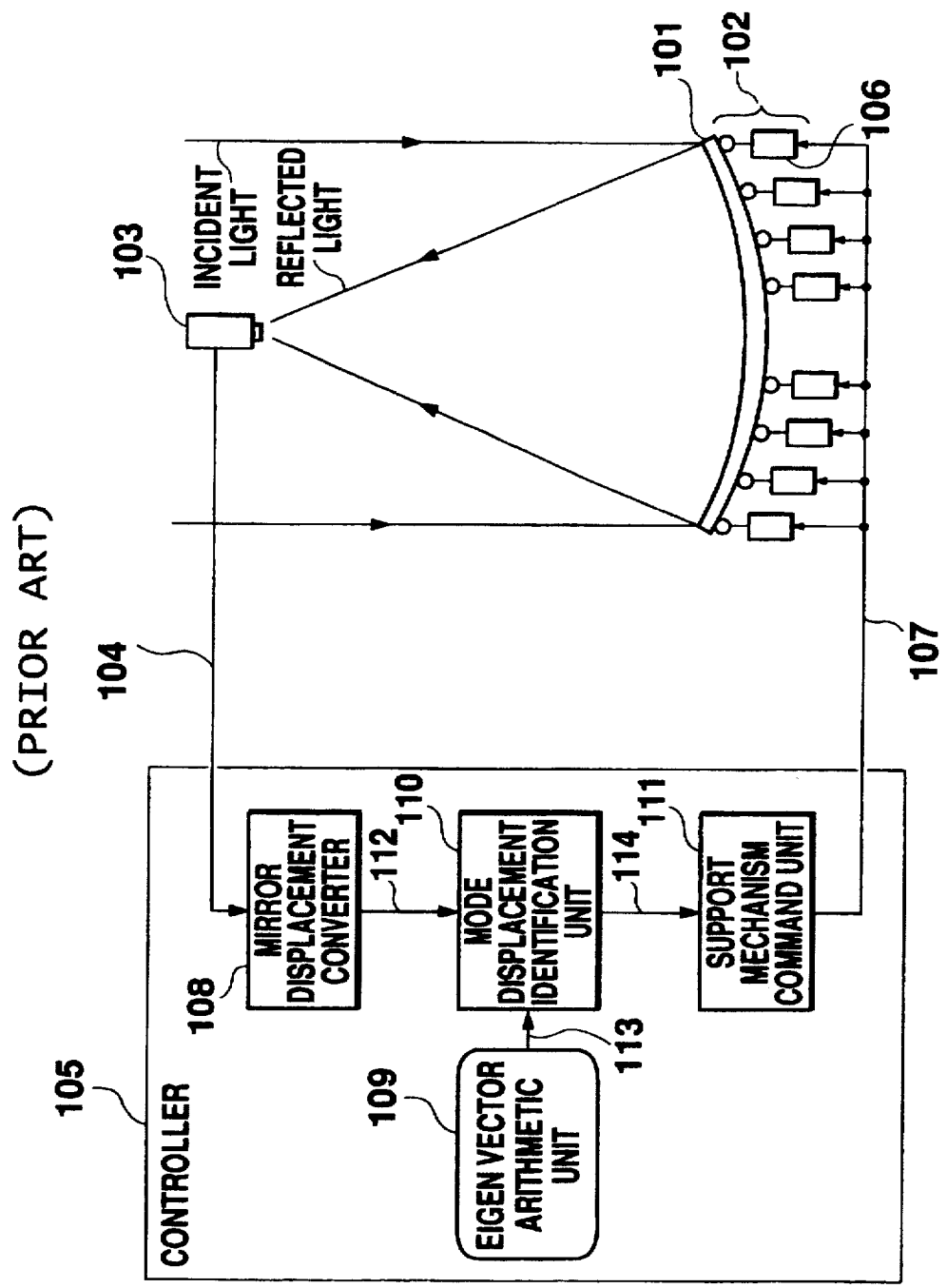
FIG. 2 is a system block diagram showing a conventional shape control apparatus using eigenvectors.
Figure 3:
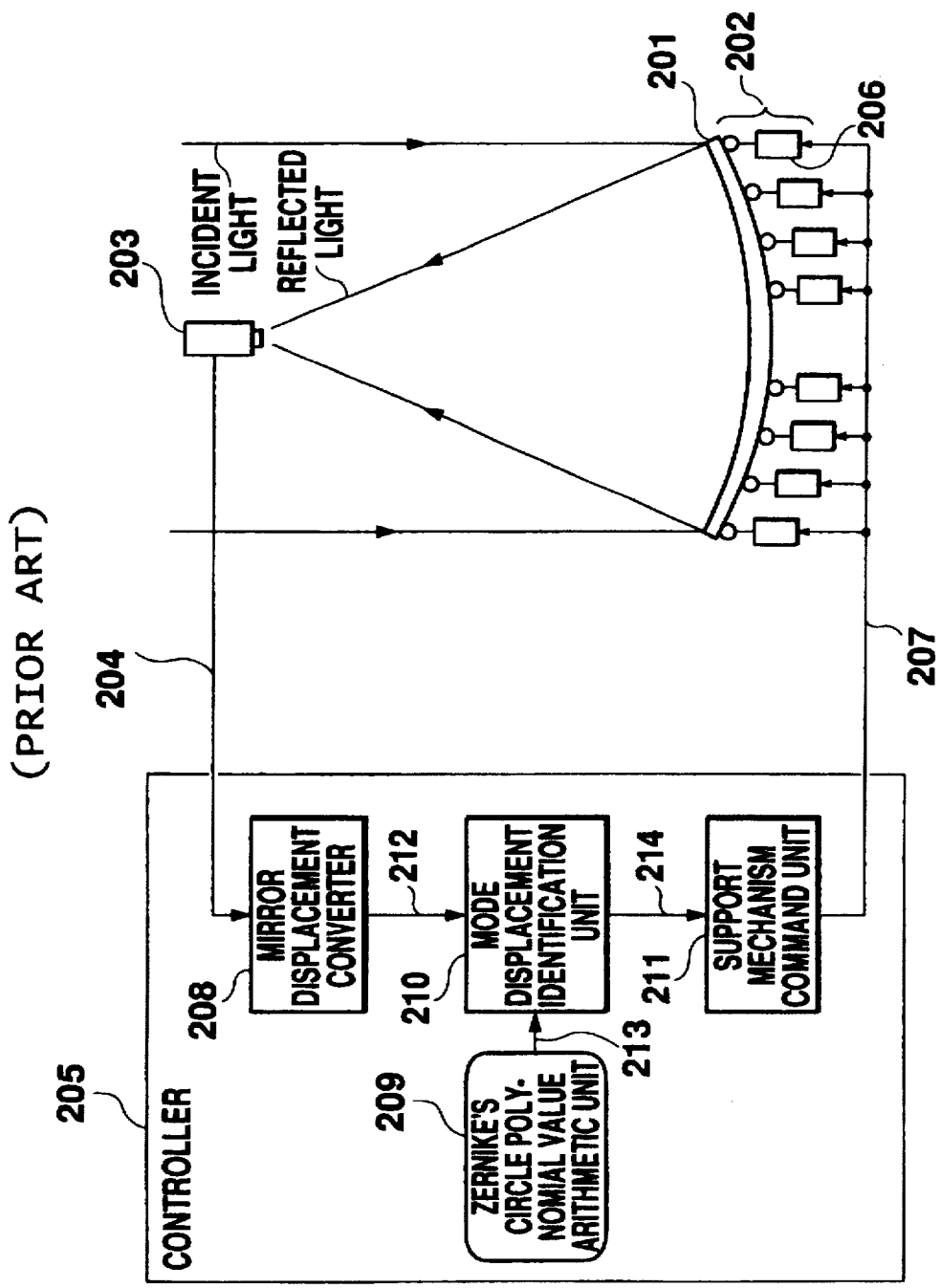
FIG. 3 is a system block diagram showing a conventional shape control apparatus using Zernike's circle polynomials.

FIG. 1 is a system block diagram showing a large, reflecting type, optical telescope embodying this invention. A reflecting mirror 1 is a concave mirror which is the primary mirror of the telescope. It is desirable for the curvature of the mirror to be small to ensure the telescope's performance so the amount of curvature of the mirror is generally designed to be small in proportion to the size of the mirror. For example, the 8 meter diameter primary mirror of the JNLT (Japan National Large Telescope) called "Subaru," an optical infrared telescope currently being constructed by the National Astronomical Observatory of Japan on top of Mount Mauna Kea on the Island of Hawaii, has a radius of curvature of 30 meters. Therefore, vibration analysis of reflecting mirrors can be conducted under an approximation which ignores the curvature of the mirror.

The reflecting mirror 1 is supported by a reflecting mirror support mechanism 2. A wavefront detector 3 detects wavefront distortion in the reflected light rays from the reflecting mirror 1 and outputs a wavefront distortion data 4. In reality, a Shack-Hartmann sensor is used for the wavefront detector 3. The principle of the Shack-Hartmann sensor will be briefly described. Reflected light rays from the reflecting mirror 1, after being converted into parallel rays of light by a collimator, pass a micro lens array, and enter a CCD array. The reflected light rays from different positions on the reflecting mirror enter the individual lenses of the micro lens array, and the reflected light rays, from the lenses into which they enter, are formed as spot images on the respective CCD image pickup areas. Deformations at various parts of the mirror are detected from movements of these spot images. The movements of these spot images represent wavefront distortion data 4 and they represent the data for discrete positions on the mirror.

A controller 5 inputs wavefront distortion data 4 and outputs a support mechanism control data 7 to actuators 6 which are included in the reflecting mirror support mechanism 2. The reflecting mirror support mechanism 2 in the above-mentioned "Subaru," for example, has just 261 fulcrum points having actuators 6 underneath the reflecting mirror 1. Each actuator 6 exerts a force based on support mechanism control data 7 onto the reflecting mirror to deform and correct the mirror's shape.

A reflecting telescope was described above in which the mirror's shape can be actively controlled and to which the shape control apparatus of this invention is applied.

A feature of the shape control apparatus of the invention lies in the controller 5. The controller 5 comprises a mirror displacement converter 8, an eigenfunction value arithmetic unit 9, a mode displacement identification unit 10, and a support mechanism command unit 11.

Mirror displacement converter 8 inputs wavefront distortion data 4 and outputs a required mirror displacement 12 that is necessary to correct the wavefront distortion. As described in the above, wavefront distortion data 4 from the Shack-Hartmann sensor is obtained for displacement measured points which are multiple discrete points on the mirror, and required mirror displacement 12 is also solved for these discrete displacement measured points.

The eigenfunction value arithmetic unit 9 outputs function values 13, which are values of eigenfunctions for the mechanical vibration of the mirror, in the specified coordinates. The mode displacement identification unit 10 obtains the values in the displacement measured points for the eigenfunction up to the mode of vibration of a prescribed degree from the eigenfunction value arithmetic unit 9. The mode displacement identification unit 10 uses this eigenfunction value to solve for a linear combination of the eigenfunction which approximates the required mirror displacement 12. A best fit approximation, which is defined mathematically, is used for this approximation. More concretely, a linear combination of the eigenfunctions is solved using the method of least squares to provide a best fit approximation in terms of least squares. The position of a fulcrum where the reflecting mirror support mechanism 2 supports the reflecting mirror does not generally coincide with a displacement measured point. The mode displacement identification unit 10 then obtains eigenfunction values at each fulcrum position from the eigenfunction value arithmetic unit 9, determines values 14 of the linear combination of the eigenfunction at the fulcrum positions, and outputs them to the support mechanism command unit 11. In other words, the mode displacement identification unit 10 determines the linear combination of the eigenfunctions from the required mirror displacement 12, and solves for the amounts of displacement necessary at the fulcrum positions through the linear combination. The support mechanism command unit 11 solves for support mechanism control data 7, which is for achieving the displacement provided by the linear combination of the eigenfunctions, and controls the actuators 6.

The controller 5 can be configured as an electronic circuit, for example. Such an electronic circuit is similar to the conventional apparatus in that it can be a set of electronic printed-circuit boards based on a microprocessor such as VMEbus cards, or a computer such as a personal computer or workstation.

A method for approximating the required mirror displacement 12 in the mode displacement identification unit 10 through a linear combination of the eigenfunctions up to a prescribed order using the method of least squares is described below using mathematical formulas. A linear combination of the eigenfunctions in the mirror is expressed in the following formula.

$$f(p) = c_1 f_1(p) + c_2 f_2(p) + \ldots + c_N f_N(p) \quad (12)$$

In this formula, $f_k(p)$ ($k=1 \sim N$) is an eigenfunction of the kth mode of vibration, p is a coordinate on the mirror, and $c_k$ ($k=1 \sim N$) is a coefficient for the eigenfunction of the respective kth mode of vibration. N is a natural number less than or equal to the number of measured points and is usually equal to the number of measured points. Matrix A, vector b, and mode displacement vector c are defined in the respective formulas given below. The integrals are surface integrals on the mirror.

$$[A]_{jk} \equiv \int_s f_j(p) f_k(p) dp \quad (13)$$

$$(b)_j \equiv \int_s f_j(p) f(p) dp \quad (14)$$

$$(c)_j = c_j, \ (j, k=1 \sim N) \quad (15)$$

Formulas 12 through 15 yield the following formula.

$$[A](c) = (b) \quad (16)$$

Since f(p) in the integral on the right side of vector b is unknown, formula 16 could not be solved in this form. This integral is approximated by a sum at the displacement measured points $p_k$ ($k=1 \sim N$). f(p) at the displacement measured points is replaced by $d_k$, which is the required mirror displacement 12 obtained from the mirror displacement converter 8, and measured vector b', which is an approximation of vector b, is defined.

$$(b')_j = f_j(p_1) \cdot d_1 + f_j(p_2) \cdot d_2 + \ldots + f_j(p_N) \cdot d_N = \langle h_j, d \rangle \equiv (b')_j \quad (17)$$

$$(h_j)_k = f_j(p_k)$$

$(d')_k=d_k$, $(j, k=1\sim N)$

Replacing vector b of formula 16 with measured vector b' yields normal equation 18.

$$|A|(c)=(b') \tag{18}$$

Formula 18 yields calculation formula 19 for determining the mode displacement vector through the method of least squares.

$$(c)=|A|^{-1}(b') \tag{19}$$

The mode displacement identification unit 10 solves formula 19 for mode displacement vector c to determine the linear combination of the eigenfunctions. Although the individual elements of matrix A (or its inverse matrix) can be calculated by obtaining each eigenfunction value one by one from the eigenfunction value arithmetic unit 9, since they are fixed values independent of measurements, values calculated beforehand can be stored in memory within the mode displacement identification unit 10, then read out to solve formula 19, thus making it possible to shorten the processing time. Next, the mode displacement identification unit 10 obtains $f_k(p)$ ($k=1\sim N$) at the fulcrum positions from the eigenfunction value arithmetic unit 9. Then, based on mode displacement vector c which has already been determined, and formula 12, the displacement at the fulcrum positions is calculated and output to the support mechanism command unit 11.

The eigenfunction differs according to the mirror's shape and constraints. A case is described in the following where the shape of the reflecting mirror 1 is circular and the conditions in which free vibrations are performed with constraints do not include fixed points. As already mentioned, the curvature of the reflecting mirror is not large. In this case, the shape control apparatus uses, as eigenfunctions of mechanical vibrations of the reflecting mirror, the eigenfunctions of mechanical vibrations of the circular plate which ignore the curvature. In other words, in a case where the reflecting mirror does not have a hole at its center, Bessel-Fourier functions which are eigenfunctions of free vibrations of a non-constrained circular plate and which are expressed in the following formulas 20 and 21 are used as the eigenfunctions.

$$f_{Anm}(\rho,\theta) = A_{nm}J_m\left(\frac{\mu_n\rho}{r_0}\right)\cos(m\theta) \tag{20}$$

$$f_{Bnm}(\rho,\theta) = B_{nm}J_m\left(\frac{\mu_n\rho}{r_0}\right)\sin(m\theta) \tag{21}$$

In these formulas, $J_m$ is a Bessel function of the first kind of degree m, $\mu_n$ is the nth extreme value point (point of maximum value or minimum value), and $r_0$ is the radius of the reflecting mirror. Incidentally, formulas 20 and 21 are eigenfunctions of free vibrations, so extreme value points may arise at the edge of the circular plate. Required mirror displacement 12 is approximated by a sum of formulas 20 and 21, where formulas 20 and 21 are given for each term including proportional coefficients of the linear combination expressed by formula 12. In other words, mode displacement vector c includes the coefficients in formulas 20 and 21 as elements and is expressed in the following formula.

$$(c)\equiv(c_1,c_2,\ldots,c_N)^T=(A_{00},B_{00},\ldots,B_{nm})^T \tag{22}$$

In this formula, $(\ )^T$ signifies a transposed matrix. Generally, the coefficient of the term corresponding to an eigenfunction of a small characteristic frequency is assigned in sequence to $c_j$ ($j=1\sim N$).

As described above, the shape control apparatus used a continuous function defined in the mirror at an approximation of required mirror displacement 12 so that mode displacement vector c is determined based on the measured value of the required mirror displacement at an arbitrary point on the reflecting mirror 1 and control of the mirror's shape can be performed. In other words, the wavefront detector 3 and the reflecting mirror 1 rotate relative to each other so that even if the measured point of the wavefront detector 3 changes, the mode displacement identification unit 10 can identify the mode displacement, and the support mechanism command unit 11 determines the amount of actuation at any point on the reflecting mirror 1 where each actuator 6 acts so that the shape of the reflecting mirror 1 can be controlled.

Furthermore, since the related continuous function is an eigenfunction of free vibrations of the mirror and is based on characteristics of the mechanical structure of the reflecting mirror, improvements in the reflecting mirror's safety and service life can also be designed.

Second Embodiment

An embodiment of this invention which is applicable to a circular reflecting mirror having its periphery fixed is described next.

System block diagrams of this and subsequent embodiments are similar to that shown in FIG. 1 so they will be omitted. However, each embodiment differs in the reflecting mirror, and in the processing in the eigenfunction value arithmetic unit and in the mode displacement identification unit. The way that the eigenfunction value arithmetic unit and the mode displacement identification unit differ from those in the first embodiment is in the eigenfunctions they use, and the procedure using them is the same as in the first embodiment so its description will be omitted.

This shape control apparatus uses eigenfunctions of free vibrations of a flat circular plate having its periphery fixed as the eigenfunctions of mechanical vibrations of the reflecting mirror, namely the Bessel-Fourier functions expressed in the following formulas 23 and 24. The terms up to a prescribed degree of these functions are used to approximate the required mirror displacement.

$$f_{Anm}(\rho,\theta) = A_{nm}J_m\left(\frac{\mu_n'\rho}{r_0}\right)\cos(m\theta) \tag{23}$$

$$f_{Bnm}(\rho,\theta) = B_{nm}J_m\left(\frac{\mu_n'\rho}{r_0}\right)\sin(m\theta) \tag{24}$$

In these formulas, $\mu_n'$ is the nth zero point, namely the point where $J_m=0$. Incidentally, since formulas 23 and 24 are eigenfunctions for a fixed periphery, the displacement at the edge of the circular plate ($\rho=r_0$) is 0. Formulas 23 and 24 correspond to formulas 20 and 21 of the above-mentioned embodiment, and mode displacement vector c in this apparatus is also expressed by formula 22.

Since, in the circular reflecting mirror having a fixed periphery, this shape control apparatus uses continuous functions which are eigenfunctions of free vibrations of the mirror and based on characteristics of the mechanical structure of the reflecting mirror to control the mirror's shape, similar to the first embodiment, control is possible even if the wavefront detector rotates with respect to the reflecting mirror, and improvements in the reflecting mirror's safety and service life can be designed.

Third Embodiment

An embodiment of this invention which is applicable to a non-constrained reflecting mirror, circular in shape and having a hole at its center, namely a ring shape, is described. This shape control apparatus uses eigenfunctions of free vibrations of a ring-shaped flat plate which is non-constrained as the eigenfunctions of mechanical vibrations of the reflecting mirror, namely the Bessel-Fourier functions expressed in the following formulas 25 through 28. In this case, the functions including Bessel functions of the second kind (Neumann functions) which diverge at the center of the circular region are included in the eigenfunctions.

$$f_{Anm}(\rho,\theta) = A_{nm}J_m\left(\frac{\mu_n\rho}{r_0}\right)\cos(m\theta) \quad (25)$$

$$f_{Bnm}(\rho,\theta) = B_{nm}J_m\left(\frac{\mu_n\rho}{r_0}\right)\sin(m\theta) \quad (26)$$

$$f_{Cnm}(\rho,\theta) = C_{nm}Y_m\left(\frac{v_n\rho}{r_0}\right)\cos(m\theta) \quad (27)$$

$$f_{Dnm}(\rho,\theta) = D_{nm}Y_m\left(\frac{v_n\rho}{r_0}\right)\sin(m\theta) \quad (28)$$

In these formulas, $Y_m$ is a Bessel function of the second kind, and $v_n$ is the nth extreme value point (point of maximum value or minimum value). Formulas 25 through 28 are expressed in the form of various terms including proportional coefficients in the linear combination of formula 12, and the required mirror displacement is approximated by a sum of the terms up to the prescribed order of formulas 25 through 28. In other words, the mode displacement vector c comprises the coefficients included in formulas 25 through 28 as elements and is expressed in the following formula.

$$(c) \equiv (c_1, c_2, \ldots c_N)^T = (A_{00}, B_{00}, C_{00}, D_{00} \ldots, D_{nm})^T \quad (29)$$

Generally, the coefficient of the term corresponding to an eigenfunction of a small characteristic frequency is assigned in sequence to $c_j$ (j=1~N).

Since, in the ring-shaped, non-constrained, reflecting mirror, this shape control apparatus uses continuous functions which are eigenfunctions of free vibrations of the mirror and based on characteristics of the mechanical structure of the reflecting mirror to control the mirror's shape, similar to the first embodiment, control is possible even if the wavefront detector rotates with respect to the reflecting mirror, and improvements in the reflecting mirror's safety and service life can be designed.

Fourth Embodiment

An embodiment of this invention which is applicable to a reflecting mirror that is ring-shaped and has its outer periphery fixed, is described. This shape control apparatus uses eigenfunctions of free vibrations of a flat ring under a condition of a fixed outer periphery as the eigenfunctions of mechanical vibrations of the reflecting mirror, namely the Bessel-Fourier functions expressed in the following formulas 30 through 33.

$$f_{Anm}(\rho,\theta) = A_{nm}J_m\left(\frac{\mu_n\rho}{r_0}\right)\cos(m\theta) \quad (30)$$

$$f_{Bnm}(\rho,\theta) = B_{nm}J_m\left(\frac{\mu_n\rho}{r_0}\right)\sin(m\theta) \quad (31)$$

$$f_{Cnm}(\rho,\theta) = C_{nm}Y_m\left(\frac{v_n\rho}{r_0}\right)\cos(m\theta) \quad (32)$$

-continued $$f_{Dnm}(\rho,\theta) = D_{nm}Y_m\left(\frac{v_n\rho}{r_0}\right)\sin(m\theta) \quad (33)$$

In these formulas, $v_n'$ is the nth zero point of a Bessel function of the second kind. Formulas 30 through 33 correspond to formulas 25 through 28 of the above-mentioned embodiment, and mode displacement vector c in this apparatus is also expressed by formula 29.

Since, in the ring-shaped reflecting mirror having a fixed outer periphery, this shape control apparatus uses continuous functions which are eigenfunctions of free vibrations of the mirror and based on characteristics of the mechanical structure of the reflecting mirror to control the mirror's shape, similar to the first embodiment, control is possible even if the wavefront detector rotates with respect to the reflecting mirror, and improvements in the reflecting mirror's safety and service life can be designed.

Fifth Embodiment

An embodiment of this invention which is applicable to a rectangular and non-constrained reflecting mirror is described. This shape control apparatus uses eigenfunctions of free vibrations of a non-constrained flat rectangular plate as the eigenfunctions of mechanical vibrations of the reflecting mirror, namely the 2-dimensional Fourier functions expressed in the following formulas 34 through 37.

$$f_{Anm}(x,y) = A_{nm}\sin\frac{n\pi x}{a}\cos\frac{m\pi y}{b} \quad (34)$$

$$f_{Bnm}(x,y) = B_{nm}\sin\frac{n\pi x}{a}\sin\frac{m\pi y}{b} \quad (35)$$

$$f_{Cnm}(x,y) = C_{nm}\cos\frac{n\pi x}{a}\sin\frac{m\pi y}{b} \quad (36)$$

$$f_{Dnm}(x,y) = D_{nm}\cos\frac{n\pi x}{a}\cos\frac{m\pi y}{b} \quad (37)$$

In these formulas, the x-axis and y-axis, having their origin at one corner of the rectangular plate, are set in the orientation of the two orthogonal edges. The lengths of the edges parallel to the x-axis and y-axis of the rectangular plate are represented by a and b respectively. Mode displacement vector c is expressed similarly to formula 29. Generally, the coefficient of the term corresponding to an eigenfunction of a small characteristic frequency is assigned in sequence to $c_j$ (j=1~N).

Since, in the non-constrained, rectangular reflecting mirror, this shape control apparatus uses continuous functions which are eigenfunctions of free vibrations of the mirror and based on characteristics of the mechanical structure of the reflecting mirror to control the mirror's shape, similar to the first embodiment, control is possible even if the wavefront detector rotates with respect to the reflecting mirror, and improvements in the reflecting mirror's safety and service life can be designed.

Sixth Embodiment

An embodiment of this invention which is applicable to a rectangular reflecting mirror having a fixed periphery is described. This shape control apparatus uses an eigenfunction of free vibrations of a flat rectangular plate having its 4 edges fixed as the eigenfunction of mechanical vibrations of the reflecting mirror, namely the 2-dimensional Fourier function expressed in the following formula 38.

$$f_{nm}(x,y) = A_{nm}\sin\frac{n\pi x}{a} \sin\frac{m\pi y}{b} \qquad (38)$$

Mode displacement vector c is expressed in the following formula.

$$(c)=(c_1,c_2,\ldots,c_N)^T=(A_{00},A_{01},\ldots,A_{nm})^T \qquad (39)$$

Since, in the rectangular reflecting mirror having a fixed periphery, this shape control apparatus uses a continuous function which is the eigenfunction of free vibrations of the mirror and based on characteristics of the mechanical structure of the reflecting mirror to control the mirror's shape, similar to the first embodiment, control is possible even if the wavefront detector rotates with respect to the reflecting mirror, and improvements in the reflecting mirror's safety and service life can be designed.

Seventh Embodiment

An embodiment of this invention which is applicable to a rectangular reflecting mirror having a pair of either vertical or horizontal opposing edges fixed is described. Edges having a length a are the fixed edges. This shape control apparatus uses eigenfunctions of free vibrations of a flat rectangular plate having a pair of edges fixed as the eigenfunctions of mechanical vibrations of the reflecting mirror, namely the 2-dimensional Fourier functions expressed in the following formulas 40 and 41.

$$f_{Anm}(x,y) = A_{nm}\sin\frac{n\pi x}{a}\cos\frac{m\pi y}{b} \qquad (40)$$

$$f_{Bnm}(x,y) = B_{nm}\sin\frac{n\pi x}{a}\sin\frac{m\pi y}{b} \qquad (41)$$

Mode displacement vector c is expressed in the following formula.

$$(c)=(c_1,c_2,\ldots,c_N)^T=(A_{00},B_{00},\ldots,B_{nm})^T \qquad (42)$$

Since, in the rectangular reflecting mirror having a pair of edges fixed, this shape control apparatus uses continuous functions which are eigenfunctions of free vibrations of the mirror and based on characteristics of the mechanical structure of the reflecting mirror to control the mirror's shape, similar to the first embodiment, control is possible even if the wavefront detector rotates with respect to the reflecting mirror, and improvements in the reflecting mirror's safety and service life can be designed.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A shape control apparatus for a reflecting mirror, comprising:

a reflecting mirror support mechanism having an actuator capable of controlling the shape of a reflecting mirror, a wavefront detector for detecting wavefront distortion in reflected light rays from the mirror and for outputting wavefront distortion data, and a controller for inputting said wavefront distortion data and for controlling the actuator of said reflecting mirror support mechanism, wherein said controller calculates, from said wavefront distortion data, a required mirror displacement which is necessary to correct for said wavefront distortion, for a plurality of points on the mirror, calculates a linear combination of eigenfunction values up to a prescribed mode of vibration in accordance with the mirror's shape and constraints, using a best fit approximation function with said required mirror displacement, and controls the actuator of said reflecting mirror support mechanism using said calculated eigenfunction values so that the actual mirror displacement at said plurality of points becomes equal to the calculated best fit approximation of said required mirror displacement.

2. The shape control apparatus for a reflecting mirror according to claim 1, wherein the shape control apparatus features the use of Bessel-Fourier functions as said eigenfunctions being defined on the mirror and representing the eigenfunctions of free vibrations of a non-constrained circular plate.

3. The shape control apparatus for a reflecting mirror according to claim 1, wherein the shape control apparatus features the use of Bessel-Fourier functions as said eigenfunctions being defined on the mirror and representing the eigenfunctions of free vibrations of a circular plate having a fixed periphery.

4. The shape control apparatus for a reflecting mirror according to claim 1, wherein the shape control apparatus features the use of Bessel-Fourier functions as said eigenfunctions being defined on the mirror and representing the eigenfunctions of free vibrations of a non-constrained circular plate having a hole at its center.

5. The shape control apparatus for a reflecting mirror according to claim 1, wherein the shape control apparatus features the use of Bessel-Fourier functions as said eigenfunctions being defined on the mirror and representing the eigenfunctions of free vibrations of a circular plate having a hole at its center and having a fixed periphery.

6. The shape control apparatus for a reflecting mirror according to claim 1, wherein the shape control apparatus features the use of 2-dimensional Fourier functions as said eigenfunctions being defined on the mirror and representing the eigenfunctions of free vibrations of a non-constrained rectangular plate.

7. The shape control apparatus for a reflecting mirror according to claim 1, wherein the shape control apparatus features the use of a 2-dimensional Fourier function as said eigenfunction being defined on the mirror and representing the eigenfunction of free vibrations of a rectangular plate having a fixed periphery.

8. The shape control apparatus for a reflecting mirror according to claim 1, wherein the shape control apparatus features the use of 2-dimensional Fourier functions as said eigenfunctions being defined on the mirror and representing the eigenfunctions of free vibrations of a rectangular plate having an opposing pair of fixed edges.

* * * * *